(12) United States Patent
Ishiyama et al.

(10) Patent No.: US 11,908,212 B2
(45) Date of Patent: Feb. 20, 2024

(54) MATCHING POSITION OUTPUT SYSTEM

(71) Applicant: NEC Corporation, Tokyo (JP)

(72) Inventors: Rui Ishiyama, Tokyo (JP); Toru Takahashi, Tokyo (JP); Kengo Makino, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/625,846

(22) PCT Filed: Jul. 22, 2019

(86) PCT No.: PCT/JP2019/028639
§ 371 (c)(1),
(2) Date: Jan. 10, 2022

(87) PCT Pub. No.: WO2021/014527
PCT Pub. Date: Jan. 28, 2021

(65) Prior Publication Data
US 2022/0262147 A1    Aug. 18, 2022

(51) Int. Cl.
*G06V 20/80* (2022.01)
*G06T 7/77* (2017.01)
(Continued)

(52) U.S. Cl.
CPC ............ *G06V 20/80* (2022.01); *G06T 1/0007* (2013.01); *G06T 7/77* (2017.01); *G06V 10/774* (2022.01); *G06V 2201/07* (2022.01)

(58) Field of Classification Search
CPC ............ G06F 16/5862; G06F 16/5838; G06F 16/583; G06V 10/25; G06V 10/993;
(Continued)

(56) References Cited

U.S. PATENT DOCUMENTS 6,795,591 B2 * 9/2004 Jahng ............... G06V 10/40
707/999.107
7,236,652 B2 * 6/2007 Kasutani ............ G06F 16/583
707/E17.02
(Continued)

FOREIGN PATENT DOCUMENTS

EP     2738738 A1    6/2014
JP    2001-266127 A   9/2001
(Continued)

OTHER PUBLICATIONS

International Search Report for PCT Application No. PCT/JP2019/028639, dated Aug. 13, 2019.
(Continued)

*Primary Examiner* — Yosef Kassa
(74) *Attorney, Agent, or Firm* — Sughrue Mion, PLLC

(57) ABSTRACT

A matching position output system includes: a shooting means configured to shoot an image of an object; a generating means configured to generate information identifying the object from the shot image of the object; and an output means configured to, based on the generated information identifying the object, acquire information of a matching position of the object from a recording means configured to associate and record the information identifying the object and the information of the matching position of the object, and output the information of the matching position of the object.

9 Claims, 18 Drawing Sheets

(51) Int. Cl.
*G06V 10/774* (2022.01)
*G06T 1/00* (2006.01)

(58) Field of Classification Search
CPC .. G06V 30/2504; G06V 20/52; G08B 13/248; G08B 13/19656; G04N 7/181; H04L 7/535; H04L 67/12

See application file for complete search history.

(56) References Cited

U.S. PATENT DOCUMENTS

| | | | | |
|---|---|---|---|---|
| 7,298,931 B2* | 11/2007 | Kim | ................ | G06F 16/583 340/5.82 |
| 7,593,602 B2* | 9/2009 | Stentiford | ............... | G06F 16/58 707/999.001 |
| 7,817,862 B2* | 10/2010 | Baba | ................ | G06F 16/5838 707/706 |
| 7,872,669 B2* | 1/2011 | Darrell | ................ | G06F 16/951 348/207.1 |
| 8,068,687 B2* | 11/2011 | Nishiyama | ............. | G06V 10/20 348/169 |
| 8,150,216 B2* | 4/2012 | Retterath | ............ | G06F 16/5838 707/E17.03 |
| 8,224,072 B2* | 7/2012 | Porikli | ................ | G06V 10/32 707/723 |
| 8,306,281 B2* | 11/2012 | Matsubara | ............ | G06F 16/532 382/218 |
| 8,412,730 B2* | 4/2013 | Shiiyama | ............ | G06V 10/422 707/769 |
| 8,548,231 B2* | 10/2013 | Shet | ................ | G06V 40/103 706/56 |
| 8,874,557 B2* | 10/2014 | Lin | ................ | G06V 10/464 707/723 |
| 8,923,590 B2* | 12/2014 | Chen | ................ | G06T 7/149 382/173 |
| 9,169,067 B2* | 10/2015 | Raney | ................ | B65D 88/30 |
| 9,176,984 B2* | 11/2015 | Hull | ................ | G06F 21/00 |
| 9,232,128 B2* | 1/2016 | Inoshita | ................ | G06T 7/74 |
| 9,740,956 B2* | 8/2017 | Chen | ................ | G06T 7/12 |
| 2014/0153831 A1 | 6/2014 | Ishiyama | | |
| 2017/0287147 A1 | 10/2017 | Takahashi et al. | | |
| 2019/0005326 A1 | 1/2019 | Kudo et al. | | |

FOREIGN PATENT DOCUMENTS

| | | |
|---|---|---|
| JP | 2016-206909 A | 12/2016 |
| JP | 2017-224009 A | 12/2017 |
| WO | 2013/018614 A1 | 2/2013 |
| WO | 2016/035774 A1 | 3/2016 |
| WO | 2017/002475 A1 | 1/2017 |

OTHER PUBLICATIONS

Extended European Search Report for EP Application No. 19938615.2 dated Jun. 27, 2022.

* cited by examiner

FIG. 2

| OBJECT IDENTIFICATION INFORMATION | MATCHING POSITION INFORMATION |
|---|---|
| B0001 | L0001 |
| B0002 | L0002 |
| ⋮ | ⋮ |
| B000n | L000n |

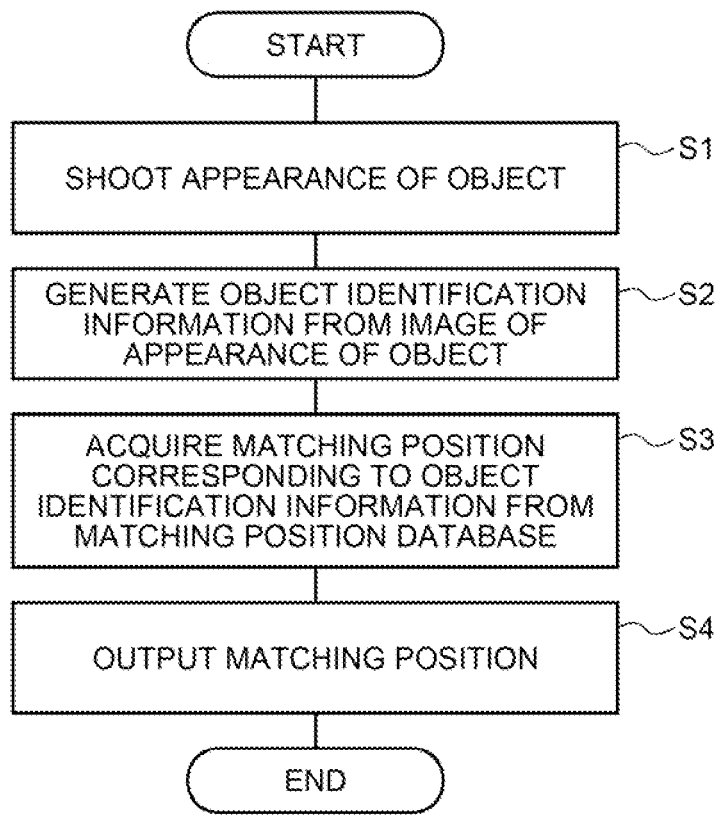

FIG. 7

| OBJECT IDENTIFICATION INFORMATION | SHOOTING CONDITION INFORMATION |
|---|---|
| B0001 | P0001 |
| B0002 | P0002 |
| ⋮ | ⋮ |
| B000n | P000n |

| INFORMATION FEATURING OBJECT SURFACE | SHOOTING CONDITION INFORMATION |
|---|---|
| R0001 | P0001 |
| R0002 | P0002 |
| ⋮ | ⋮ |
| R000m | P000m |

MATCHING POSITION OUTPUT SYSTEM

This application is a National Stage Entry of PCT/JP2019/028639 filed on Jul. 22, 2019, the contents of all of which are incorporated herein by reference, in their entirety.

TECHNICAL FIELD

The present invention relates to a matching position output system, a matching position output method, and a recording medium.

BACKGROUND ART

Product numbers have been assigned to products and the like, and have been used for quality and distribution management of the products. A method of attaching barcodes, IC tags, or RFIDs to products and identifying a lot or individual of products has also been used. However, for example, in the case of an object such as a minute product, it has been difficult in terms of cost and technique to print letters on individual objects or attach IC tags to individual objects, and it has been difficult to perform lot or individual management using the above method.

On the other hand, in recent years, a method of identifying a random pattern on the surface of an object such as a product or the surface of a material applied to the surface of the object with an image and performing individual identification or authenticity determination of the object is proposed (see Patent Document 1, for example). For such individual identification or authenticity determination by random pattern, a random pattern image acquired at a predetermined matching position on a registration target object is previously registered as registration data, and a random pattern acquired at a matching position on a determination target object is compared as matching data with the registration data, whereby it is determined whether or not the objects are the same.

Patent Document 1: WO2017/002475

In the case of performing individual identification or authenticity determination of an object by a random pattern image, it is impossible to perform accurate identification or determination unless a matching position on an object from which registration data is acquired corresponds to a matching position on an object from which matching data is acquired. Therefore, on an object on which individual identification or authenticity determination is performed, a matching position of the object is determined in advance. However, the matching position of the object determined in advance cannot be checked with ease.

SUMMARY

An object of the present invention is to provide a matching position output system which solves the abovementioned problem, that is, the difficulty in checking a matching position of an object with ease.

A matching position output system according to an aspect of the present invention includes: a shooting means configured to shoot an image of an object; a generating means configured to generate information identifying the object from the shot image of the object; and an output means configured to, based on the generated information identifying the object, acquire information of a matching position of the object from a recording means configured to associate and record the information identifying the object and the information of the matching position of the object, and output the information of the matching position of the object.

Further, a matching position output method according to another aspect of the present invention includes: shooting an image of an object; generating information identifying the object from the shot image of the object; and based on the generated information identifying the object, acquiring information of a matching position of the object from a recording means configured to associate and record the information identifying the object and the information of the matching position of the object, and outputting the information of the matching position of the object.

Further, a non-transitory computer-readable recording medium according to another aspect of the present invention has a program recorded thereon. The program includes instructions for causing a computer to execute: a process of shooting an image of an object; a process of generating information identifying the object from the shot image of the object; and a process of, based on the generated information identifying the object, acquiring information of a matching position of the object from a recording means configured to associate and record the information identifying the object and the information of the matching position of the object, and outputting the information of the matching position of the object.

With the configurations as described above, the present invention enables easy check of a matching position of an object.

BRIEF DESCRIPTION OF DRAWINGS

FIG. 2 is a view showing an example of the content of a matching position database in the matching position output apparatus according to the first example embodiment of the present invention;

FIG. 4 is a flowchart showing an example of an operation of the matching position output apparatus according to the first example embodiment of the present invention;

FIG. 7 is a view showing a content example of a shooting condition database in the matching position output apparatus according to the second example embodiment of the present invention;

FIG. 10 is a view showing a content example of a shooting condition database in the matching position output apparatus according to the third example embodiment of the present invention;

EXAMPLE EMBODIMENTS

First Example Embodiment

Figure 1:
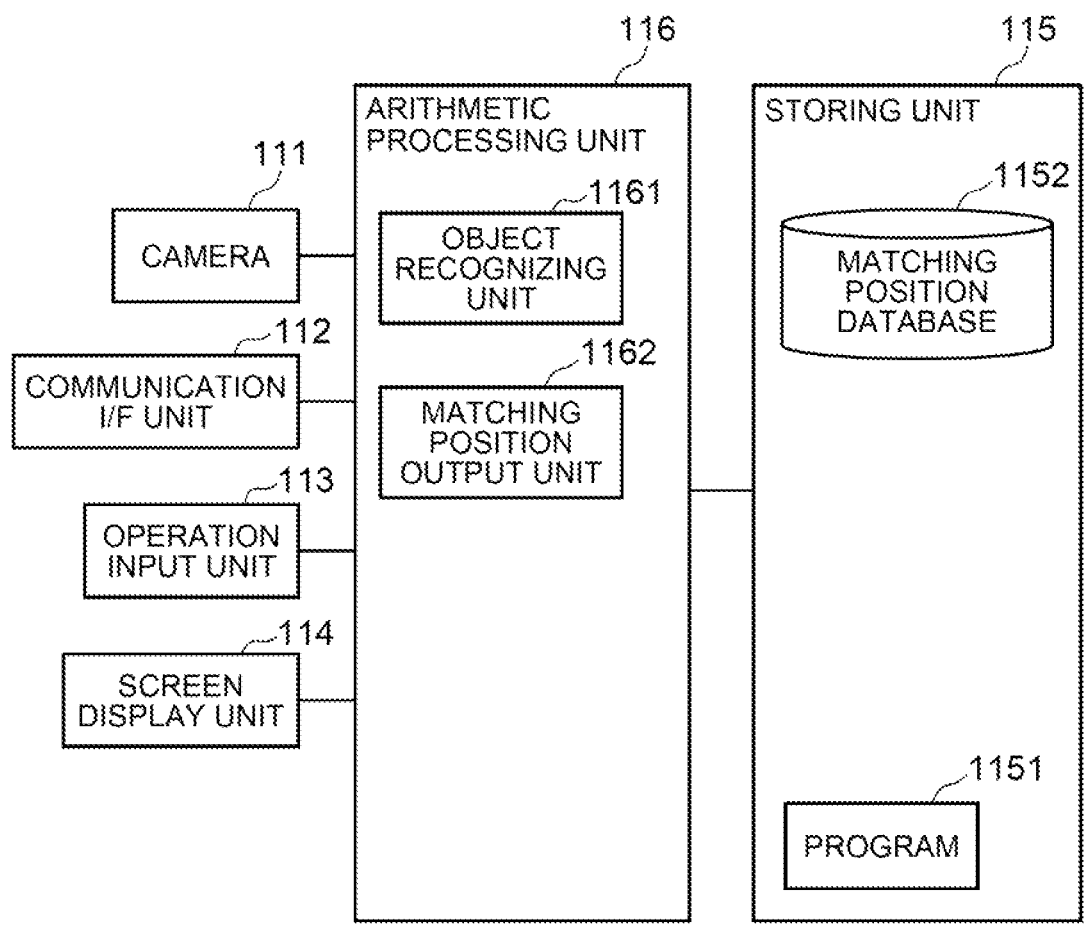
FIG. 1 is a block diagram of a matching position output apparatus according to a first example embodiment of the present invention.

First, a matching position output apparatus 100 according to a first example embodiment of the present invention will be described. FIG. 1 is a block diagram of the matching position output apparatus 100. Referring to FIG. 1, the matching position output apparatus 100 includes a camera 111, a communication I/F unit 112, an operation input unit 113, a screen display unit 114, a storing unit 115, and an arithmetic processing unit 116.

The camera 111 is a shooting means for shooting the appearance of an object to be the target for matching position check. The camera 111 may be, for example, a visible-light color camera including a CCD (Charge-Coupled Device) image sensor or a CMOS (Complementary MOS) image sensor having a pixel capacity of about several million pixels.

The communication I/F unit 112 is composed of a dedicated data communication circuit, and is configured to perform data communication with various devices connected via a wireless network or the like. The operation input unit 113 is composed of operation input devices such as a keyboard and a mouse, and is configured to detect an operation of an operator and output the operation to the arithmetic processing unit 116. The screen display unit 114 is composed of a screen display device such as an LCD (Liquid Crystal Display) or a PDP (Plasma Display Panel), and is configured to display on a screen various information such as a matching position in accordance with an instruction from the arithmetic processing unit 116.

The storing unit 115 is composed of storage devices such as a hard disk and a memory, and is configured to store therein processing information and a program 1151 that are necessary for various processing in the arithmetic processing unit 116. The program 1151 is a program that is loaded to and executed by the arithmetic processing unit 116 to realize various processing units, and is previously loaded from an external device (not shown) or a recording medium (not shown) via a data input/output function such as the communication I/F unit 112 and stored into the storing unit 115. Major processing information stored in the storing unit 115 is a matching position database 1152.

The matching position database 1152 is configured to record therein object identification information and matching position information so that they are associated with each other. FIG. 2 shows an example of the content of the matching position database 1152. In this example, the matching position database 1152 is composed of a plurality of entries, and each of the entries has an object identification information field and a matching position information field. In a case where there are n kinds of objects that are the targets for matching position check, the matching position database 1152 is composed of n entries, and each of the entries has a one-to-one correspondence to an object type. Moreover, in the object identification information field of an entry corresponding to one kind of object, object identification information B0001 or the like that identifies this kind of object is recorded. The object identification information B0001 or the like may be a character string, a symbol string, a number string, or a combination thereof. Moreover, in the matching position information field, information L0001 or the like that identifies a matching position set for the kind of object is recorded. The matching position information L0001 or the like may be either a text or an image or may be a combination of a text and an image as long as it is information that can specify a matching position.

As examples of the n kinds of objects that are the targets for matching position check, surgical instruments such as medical scissors, a scalpel and forceps are provided in this embodiment. However, an object in the present invention is not limited to a surgical instrument, and may be any object such as a machine tool or sports equipment.

Figure 3A:
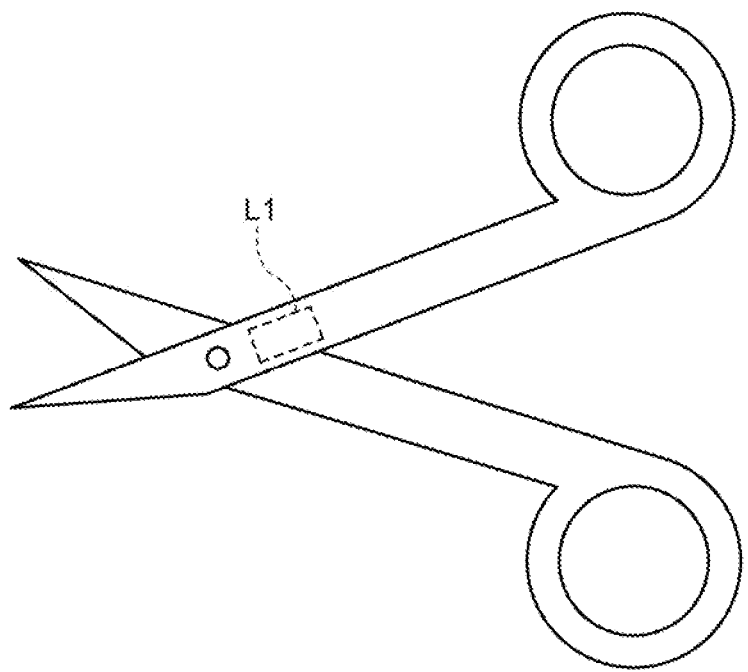
FIG. 3A is a view showing an example of an image in which a matching position is marked on an appearance image of medical scissors.
Figure 3B:
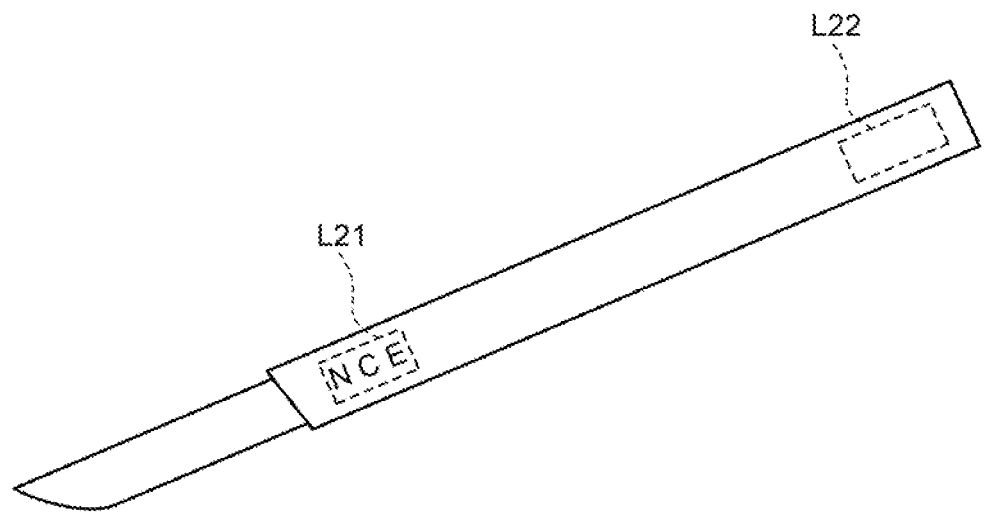
FIG. 3B is a view showing an example of an image in which two matching positions are marked on an appearance image of a medical scalpel.

FIG. 3A shows an example of a matching position set on medical scissors. In this example, a rectangular matching position L1 is set near a hinge of the medical scissors. Moreover, FIG. 3B shows an example of a matching position set on a medical scalpel. In this example, a circumscribed rectangle of a logo mark engraved on the medical scalpel is set at one matching position L21, and another matching position L22 is set in the vicinity of an end on the hand side. Thus, two or more matching positions may be set on one object.

For example, in a case where object identification information B0001 is allocated to the medical scissors shown in FIG. 3A, information that specifies a matching position L1 is set in matching position information L0001 of the matching position database 1152. Moreover, in a case where object identification information B0002 is allocated to the medical scalpel shown in FIG. 3B, information that specifies the matching positions L21 and L22 is set in matching position information L0002 of the matching position database 1152. As mentioned above, the matching position information is any information as long as it is information that enables specification of a matching position. For example, as shown in FIGS. 3A and 3B, an image in which a matching position is defined in an appearance image of an object can be matching position information.

The arithmetic processing unit 116 has a microprocessor such as an MPU and a peripheral circuit thereof, and is configured to, by loading the program 1151 from the storing unit 151 and executing the program 1151, cause the above hardware to cooperate with the program 1151 and realize various processing units. Major processing units realized by the arithmetic processing unit 116 are an object recognizing unit 1161 and a matching position output unit 1162.

The object recognizing unit 1161 is configured to generate information (object identification information) that identifies an object from an image of the object shot with the camera 111. This image is an image that captures an object globally in order to identify the kind of the object, regardless of a minute individual difference of an object. To be specific, as an example, a range of 50 cm square is shot so that the entire medical scissors of about 20 cm captured. It is needless to say that a plurality of objects or different objects may be shot simultaneously. The camera 111 is a camera with one million pixels (about 1000×1000 pixels), and its resolution is 0.5 mm per pixel. With this level of resolution, it is difficult to capture a random pattern of an object such as medical scissors whose surface is made smooth due to insufficient resolution. Moreover, the object recognizing unit 1161 is configured to transmit the generated object identification information to the matching position output unit 1162.

The matching position output unit 1162 is configured to, based on information that identifies an object generated by the object recognizing unit 1161, acquire matching position information of the object from the matching position output unit 1162. Moreover, the matching position output unit 1162 is configured to display the acquired matching position information on the display screen of the screen display unit 114, or/and transmit to an external device through the communication I/F unit 112.

Next, an operation of the matching position output apparatus 100 will be described. FIG. 4 is a flowchart showing an example of the operation of the matching position output apparatus 100. Referring to FIG. 4, first, the object recognizing unit 1161 shoots an image of the appearance of an object to be the target for matching position check with the camera 111 (step S1). For example, the shooting can be manually performed by the operator. Next, the object recognizing unit 1161 inputs the image of the appearance of the object shot with the camera 111, and performs object recognition to generate object identification information (step S2).

Next, the matching position output unit 1162 acquires matching position information from the matching position database 1152 based on the object identification information generated by the object recognizing unit 1161 (step S3). For example, the matching position output unit 1162 selects one entry having object identification information agreeing with the object identification information generated by the object recognizing unit 1161 in the object identification information field from among entries recorded in the matching position database 1152, and acquires matching position information recorded in the matching position information field of the selected entry. Next, the matching position output unit 1162 displays the acquired matching position information on the screen display unit 114, or/and transmits the acquired matching position information to an external device via the communication I/F unit 112 (step S4).

Thus, the matching position output apparatus 100 enables easy check of the matching position of an object. The reason is that when an image of the appearance of an object that is the target for matching position check is shot with the camera 111, the object recognizing unit 1161 generates object identification information by object recognition from the shot image of the appearance of the object, and the matching position output unit 1162 acquires matching position information corresponding to the generated object identification information from the matching position database 1152 in which object identification information and matching position information are recorded so as to be associated with each other and displays the matching position information on the screen display unit 114 or/and transmits the matching position information to an external device through the communication I/F unit 112.

Subsequently, a configuration example of the object recognizing unit 1161 will be described.

Figure 5:
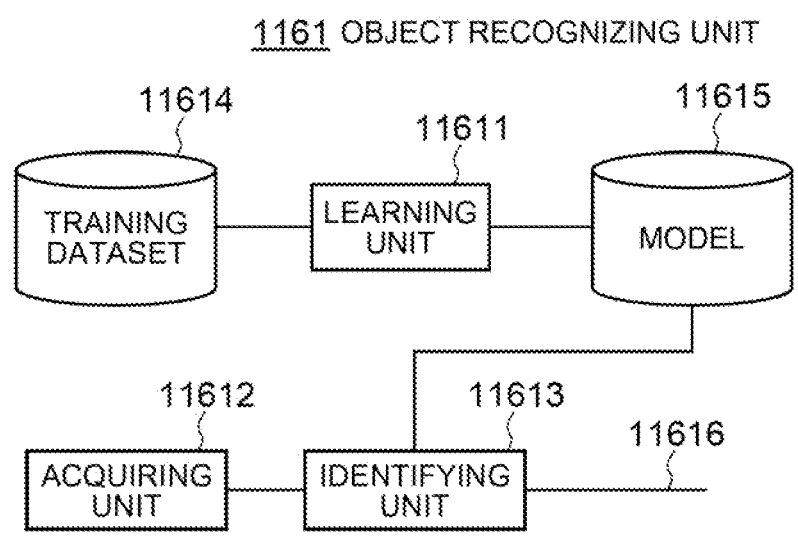
FIG. 5 is a block diagram showing a configuration example of an object recognizing unit in the matching position output apparatus according to the first example embodiment of the present invention.

FIG. 5 is a block diagram showing a configuration example of the object recognizing unit 1161. The object recognizing unit 1161 of this example includes a learning unit 11611, an acquiring unit 11612, a recognizing unit 11613, a training dataset 11614, and a model 11615.

The training dataset 11614 is the set of data in which images of the appearances of objects that are the targets for matching position check are associated with identification information of the objects shown by the images. The training dataset 11614 exists for each kind of object that is the target for matching position check. Moreover, the training dataset 11614 corresponding to one kind of object includes a plurality of training data. One training data contains a pair of an object appearance image and object identification information. A plurality of object identification information included by a plurality of training data corresponding to one kind of object are all the same. On the other hand, a plurality of object appearance images included in a plurality of training data corresponding to one kind of object are different from each other in shooting conditions such as the posture of the object, shooting direction and lighting condition at the time of shooting. Use of such training dataset 11614 enables object recognition that is robust against shooting conditions such as the posture of an object, shooting direction and lighting condition at the time of shooting.

The learning unit 11611 is configured to learn by an object recognition method by deep learning using the training dataset 11614 and generate the model 11615. The learning unit 11611 structures the model 11615 on a convolutional neural network (CNN), for example. The object recognition method by deep learning used by the learning unit 11611 can be, for example, an R-CNN based algorithm, or a YOLO (You Only Look Once) type algorithm, or the like.

The acquiring unit 11612 is configured to acquire an image of the appearance of an object that is the target for matching position check from the camera 111. The recognizing unit 11613 is configured to input the image of the appearance of the object acquired by the acquiring unit 11612, perform inference by an object recognition method by deep learning from the input image using the model 11615 to detect a specific identification target, and output the object identification information 11616 representing the detected identification target.

Next, an operation of the object recognizing unit 1161 shown in FIG. 5 will be described. The operation of the object recognizing unit 1161 is classified roughly into a learning operation and a recognition operation. In the learning operation, the learning unit 11611 generates the model 11615 using the training dataset 11614. In the recognition operation, the recognizing unit 11613 generates identification information of an object to be the target for matching position check from an image of the appearance of the object using the model 11615, and outputs the identification information.

Although the configuration example of the object recognizing unit 1161 is described above, the object recognizing unit 1161 is not limited to the above configuration example. For example, the object recognizing unit 1161 may be configured to read a product code attached to an object by a barcode reader or the like, and generate object identification information based on a correspondence table that previously associates a product code with object identification information.

Subsequently, an example of use of the matching position output apparatus 100 will be described.

In individual identification and authenticity determination using a random pattern image, an operation of acquiring a random pattern image from a matching position on a registration target object and registering the random pattern image into a database, and an operation of acquiring a random pattern image from a matching position on a determination target object and matching the random pattern image against the database are performed.

In the registration operation and the matching operation, an operation of shooting a random pattern image at a matching position of a registration target object and a random pattern image at a matching position of a matching target object with a camera under an appropriate shooting condition is performed. In the case of manually performing this shooting operation, it is difficult to perform accurate shooting unless a shooting person accurately recognizes a matching position of a shooting target object. Matching positions are generally different if the kinds of objects are different. The matching position output apparatus 100 is used in such a scene. When a shooting person shoots an image of the appearance of a shooting target object with the camera 111, the object recognizing unit 1161 performs object recognition on the shot image of the appearance of the object and generates object identification information. Next, the matching position output unit 1162 displays, on the screen display unit 114, matching position information stored in the matching position database 1152 corresponding to the generated object identification information. With this, the shooting person can visually check with ease where the matching position of the shooting target object is. Besides, the shooting conditions are conditions such as parameters of the zoom magnification of camera lens, lighting condition or the like and the setting values of equipment for obtaining resolution required for shooting a random pattern of a target object. As an example, in the case of medical scissors, a range of 10 mm is shot with resolution of one million pixels (1000×1000 pixels). In this example, the resolution of the random pattern is about 0.01 mm per pixel, which enables shooting of the random pattern with sufficient resolution for matching. It is also possible to shoot with the same camera as the camera 111 with different settings, or shoot with a different camera, lens, or lighting equipment.

Second Example Embodiment

Figure 6:
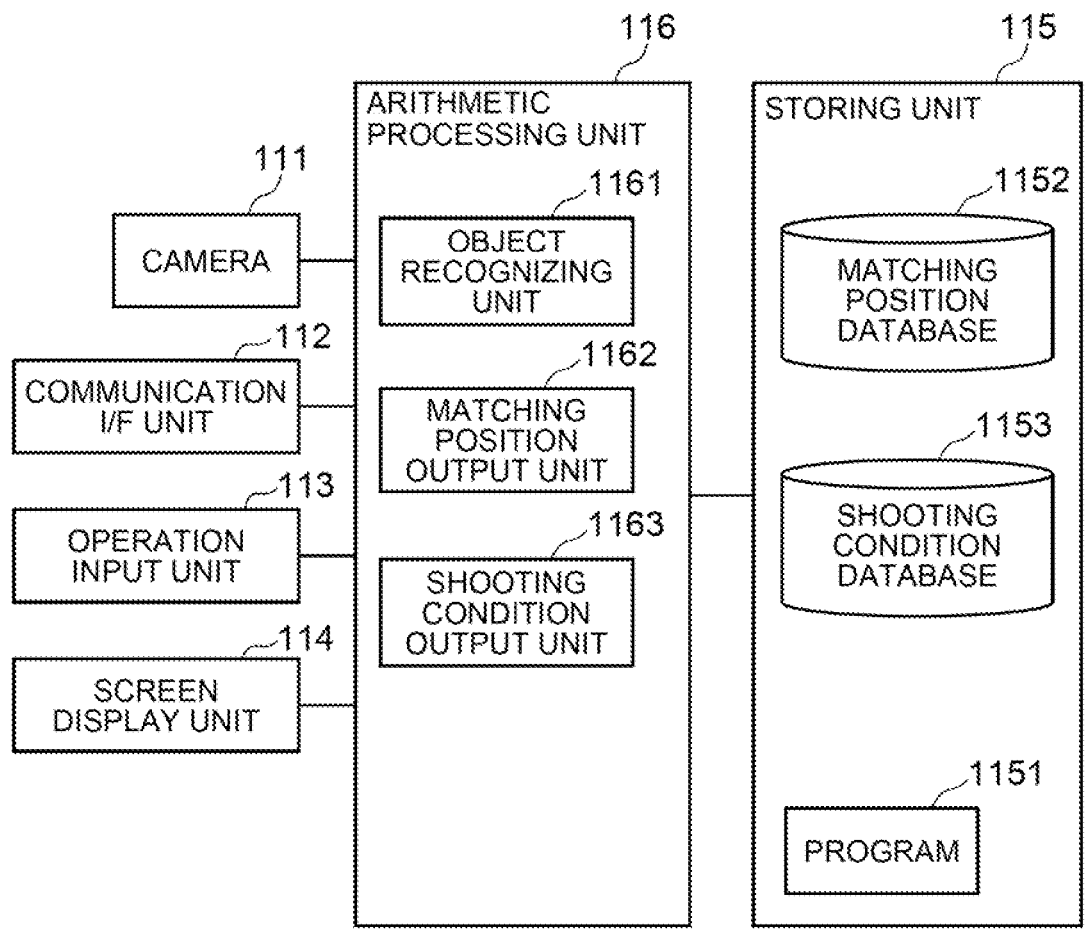
FIG. 6 is a block diagram of a matching position output apparatus according to a second example embodiment of the present invention.

Next, a matching position output apparatus 200 according to a second example embodiment of the present invention will be described. FIG. 6 is a block diagram of the matching position output apparatus 200, where the same reference numerals as in FIG. 1 denote the same parts, reference numeral 1153 denotes a shooting condition database, and reference numeral 1163 denotes a shooting condition output unit 1163.

The shooting condition database 1153 is configured so that object identification information and shooting condition information are associated with each other and recorded. FIG. 7 shows an example of the content of the shooting condition database 1153. In this example, the shooting condition database 1153 includes a plurality of entries, and each of the entries has an object identification information field and a shooting condition information field. In a case where there are n kinds of objects to be the targets for matching position check, the shooting condition database 1153 includes n entries, and each of the entries has a one-to-one correspondence to each of the kinds of the objects. In the object identification information field of an entry corresponding to one kind of object, object identification information B0001 or the like that identifies this kind of object in the matching position database 1153 is recorded. In the shooting condition information field, shooting condition information P0001 or the like that is appropriate for shooting a matching position set on this kind of object is recorded. The shooting condition information P0001 or the like may be either a text or an image, or may be a combination of text and image, as long as it is information that can identify a shooting condition.

A condition for shooting a matching position set on an object is, for example, an illumination angle. An illumination angle is an angle at which illumination light enters the surface of an object. Another example of the shooting condition is image resolution. Image resolution is represented by, for example, DPI (Dot Per Inch). Moreover, since there is a certain causal relation between image resolution and shooting magnification, shooting magnification may be used instead of image resolution. However, the shooting condition is not limited to the above examples. The distance between an object and a camera, the intensity of illumination light, the wavelength of illumination light, the magnitude of illumination, and the like, are other examples of the shooting condition. A shooting condition identified by the shooting condition information P0001 or the like may one identifying any one or more of the shooting conditions illustrated above.

The shooting condition output unit 1163 is configured to acquire shooting condition information of an object from the shooting condition database 1153 based on information identifying the object generated by the object recognizing unit 1161. Moreover, the shooting condition output unit 1163 is configured to display the acquired shooting condition information on the display screen of the screen display unit 114, or/and transmit the acquired shooting condition information to an external device through the communication I/F unit 112.

Figure 8:
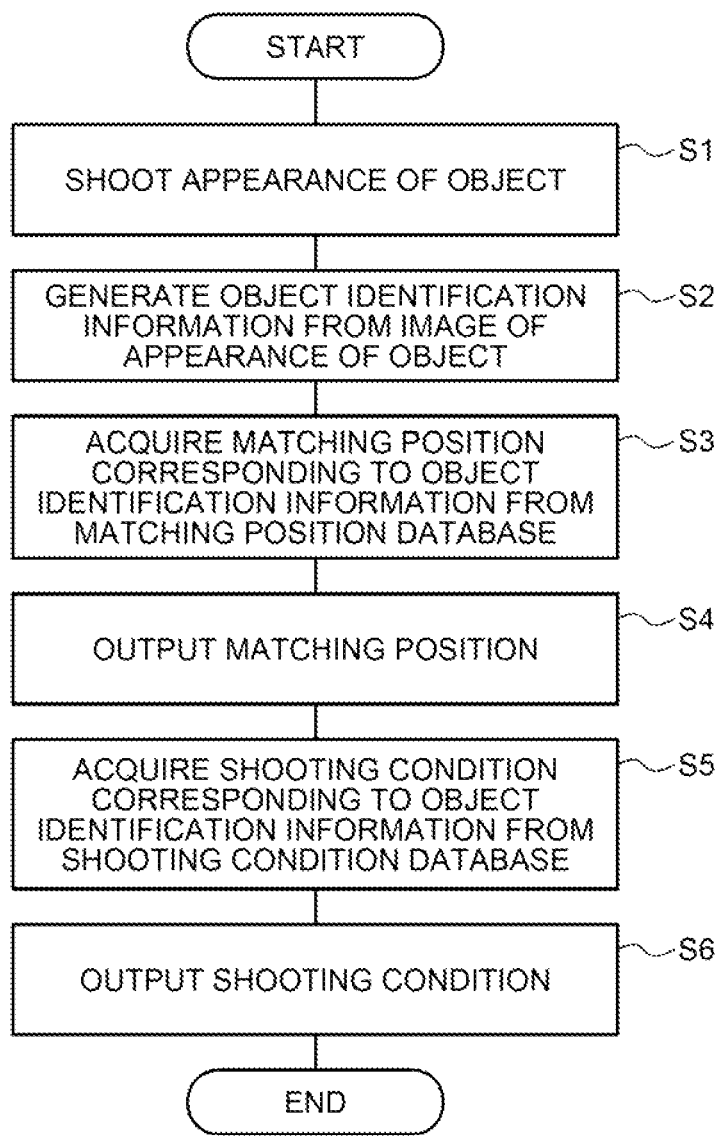
FIG. 8 is a flowchart showing an example of an operation of the matching position output apparatus according to the second example embodiment of the present invention.

Next, an operation of the matching position output apparatus 200 will be described. FIG. 8 is a flowchart showing an example of the operation of the matching position output apparatus 200. Referring to FIG. 8, after performing the same operation as the matching position output apparatus 100 described with reference to FIG. 4 (steps S1 to S4), the matching position output apparatus 200 further performs the following operation. First, the shooting condition output unit 1163 acquires shooting condition information from the shooting condition database 1153 based on the object identification information generated by the object recognizing unit 1161 (step S5). For example, the shooting condition output unit 1163 selects one entry having, in the object identification information field, object identification information agreeing with the object identification information generated by the object recognizing unit 1161 from among the entries recorded in the shooting condition database 1153, and acquires shooting condition information recorded in the shooting condition information field of the selected entry. Next, the shooting condition output unit 1163 displays the acquired shooting condition information on the screen display unit 114, or/and transmits the acquired shooting condition information to an external device through the communication I/F unit 112 (step S6).

Thus, the matching position output apparatus 200 enables not only easy check of the matching position of an object, but also easy check of a shooting condition appropriate for shooting a random pattern image at the matching position. The reason is that when an image of the appearance of an object that is the target for checking a matching position and a shooting condition is shot with the camera 111, the object recognizing unit 1161 generates object identification information by object recognition from the shot image of the appearance of the object, the matching position output unit 1162 and the shooting condition output unit 1163 acquire matching position information and shooting condition information corresponding to the generated object identification from the matching position database 1152 in which object identification information and matching position information are associated with each other and recorded and from the shooting condition database 1153 in which object identification information and shooting condition information are associated with each other and recorded, displays the matching position information and shooting condition information on the screen display unit 114, or/and transmits the matching position information and shooting condition information to an external device through the communication I/F unit 112.

Subsequently, an example of use of the matching position output apparatus 200 will be described.

In individual identification and authenticity determination using a random pattern image, an operation of shooting a random pattern image at a matching position of a registration target object and a random pattern image at a matching position of a matching target object with a camera under an appropriate shooting condition is performed. In the case of manually performing this shooting operation, it is difficult to shoot an image from which a random pattern image unique to an object can be stably read unless a shooting person accurately recognizes a matching position of a shooting target object and an appropriate shooting condition. Matching positions are generally different if the kinds of objects are different. Appropriate shooting conditions are also generally different if the kinds of objects are different and the qualities of materials or the like are different. The matching position output apparatus 200 is used in such a scene. When a shooting person shoots an image of the appearance of a shooting target object with the camera 111, the object recognizing unit 1161 performs object recognition on the shot image of the appearance of the object and generates object identification information. Next, the matching position output unit 1162 displays, on the screen display unit 114, matching position information stored in the matching position database 1152 corresponding to the generated object identification information. With this, the shooting person can visually check with ease where a matching position of the shooting target object is. Furthermore, the shooting condition output unit 1163 displays, on the screen display unit 114, shooting condition information stored in the shooting condition database 1153 corresponding to the generated object identification information. With this, the shooting person can easily check a shooting condition for shooting the matching position of an object.

In this example embodiment, the shooting condition output unit 1163 is configured to display acquired shooting condition information on the display screen of the screen display unit 114, or/and transmit acquired shooting condition information to an external device through the communication I/F unit 112. However, the shooting condition output unit 1163 may be configured to automatically regulate a shooting condition based on the acquired shooting condition information.

Third Example Embodiment

Figure 9:
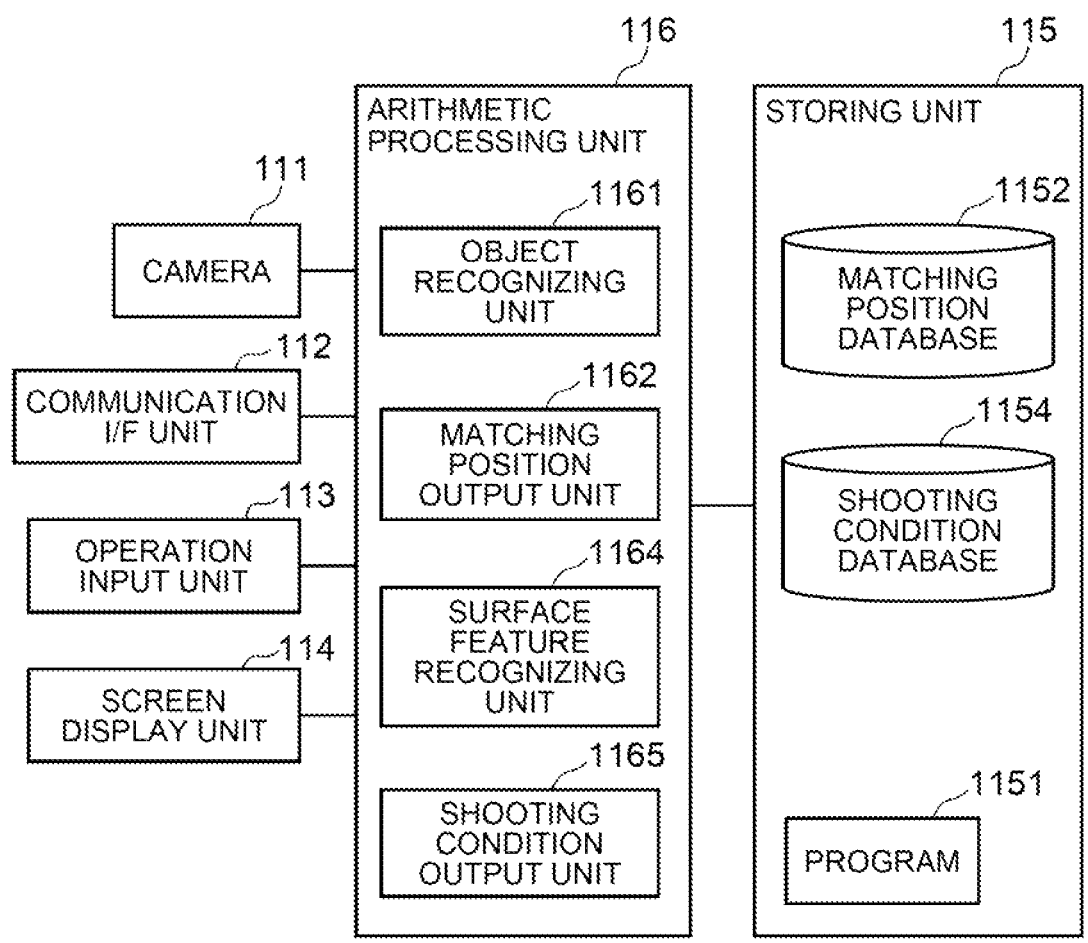
FIG. 9 is a block diagram of a matching position output apparatus according to a third example embodiment of the present invention.

Next, a matching position output apparatus 300 according to a third example embodiment of the present invention will be described. FIG. 9 is a block diagram of the matching position output apparatus 300, where the same reference numerals as in FIG. 1 denote the same parts, reference numeral 1154 denotes a shooting condition database, reference numeral 1164 denotes a surface feature recognizing unit, and reference numeral 1165 denotes a shooting condition output unit.

The shooting condition database 1154 is configured so that information featuring object surface and shooting condition information are associated with each other and recorded. FIG. 10 shows an example of the content of the shooting condition database 1154. In this example, the shooting condition database 1154 includes a plurality of entries, and each of the entries has a field of information featuring object surface and a shooting condition information field. In a case where there are m kinds of information featuring object surface, the shooting condition database 1153 includes m entries, and each of the entries has a one-to-one correspondence to each kind of information featuring object surface.

In the field of information featuring object surface of each entry, predetermined information featuring object surface is recorded. One example of the information featuring object surface is information representing the material of object surface. For example, metal, ceramic, resin, carbon fiber, glass, paper, wood, steel, and the like are examples of the information representing the material. Another example of the information featuring object surface is information representing the roughness of object surface. For example, the arithmetic mean roughness (Ra) is an example of the information representing the roughness of object surface. Still another example of the information featuring object surface is the shape of an object (individual identification target) in a shot image. Examples of the shape include plane (rectangle), polygon, circle, ring (doughnut shape), and so on. It can be said that the shape is a two-dimensional shape of the surface of a shooting target. It can also be said that the shape is the shape of an image area on an object surface from which a random pattern image is extracted. Other examples of data featuring object surface include reflectance, transmittance, optical properties, a processing method such as satin finish or lathe machining of object surface, and the like. In the field of information featuring object surface of the shooting condition database 1154, predetermined one of the information illustrated above or a combination of some of the information are recorded.

Further, in the shooting condition information field of the shooting condition database 1154, shooting condition information P0001 or the like that identifies a shooting condition appropriate for shooting the matching position of an object identified by the information featuring object surface is recorded. As described above, the shooting conditions include an illumination angle, image resolution, and the like. It is desirable to learn shooting conditions in advance for each kind of information featuring object surface.

The surface feature recognizing unit 1164 is configured to generate information featuring the surface of an object from an image of the appearance of the object shot with the camera 111. Moreover, the surface feature recognizing unit 1164 is configured to transmit the generated information featuring the surface of the object to the shooting condition output unit 1165.

The shooting condition output unit 1165 is configured to acquire shooting condition information of an object from the shooting condition database 1154 based on the information featuring the surface of the object generated by the surface feature recognizing unit 1164. To be specific, first, the shooting condition output unit 1165 calculates the approximation between the abovementioned generated information featuring the surface of the object and information featuring object surface recorded in each of the entries of the shooting condition database 1154. A method for calculating the approximation between the information featuring the object surfaces may be any method as long as it enables quantitative comparison of the approximations between the information. Next, the shooting condition output unit 1165 acquires, from the shooting condition database 1154, shooting condition information corresponding to information featuring object surface that has the largest approximation with (that is most approximate to) the information featuring the surface of the object generated by the surface feature recognizing unit 1164. Moreover, the shooting condition output unit 1165 is configured to display the acquired shooting condition information on the display screen of the screen display unit 114 or/and transmit the acquired shooting condition information to an external device through the communication I/F unit 112.

Figure 11:
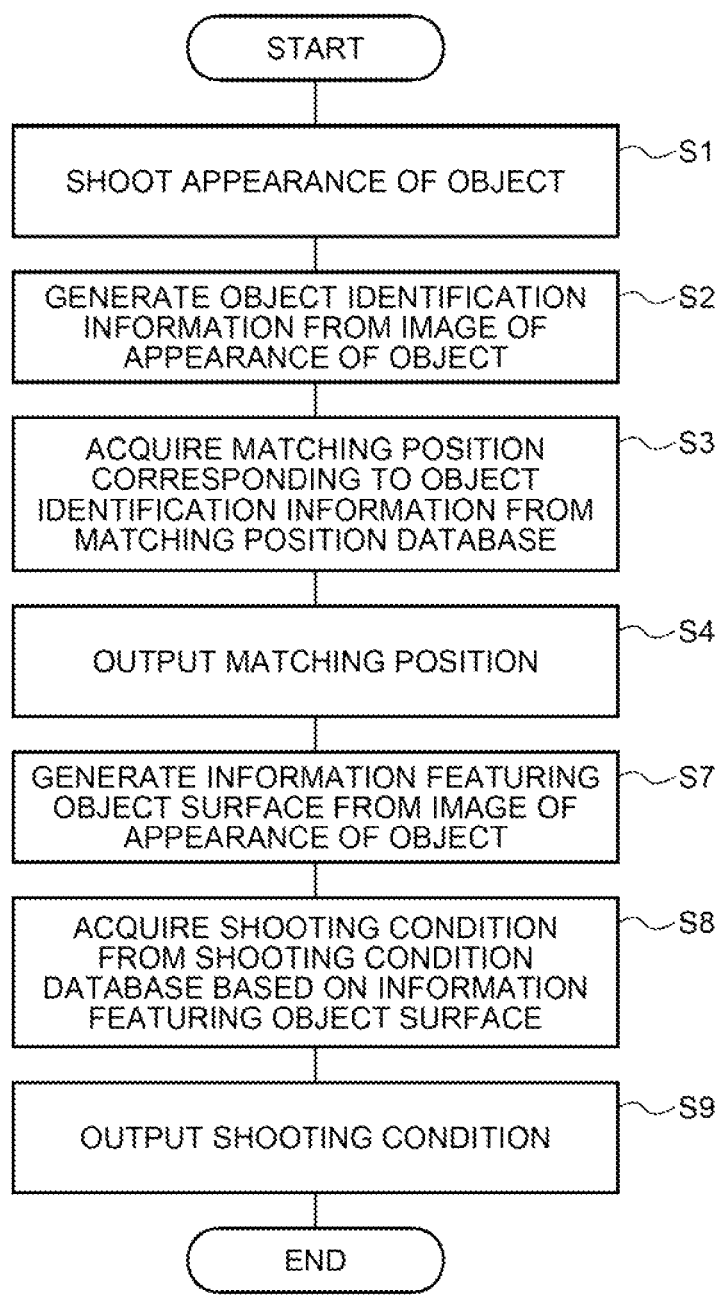
FIG. 11 is a flowchart showing an example of an operation of the matching position output apparatus according to the third example embodiment of the present invention.

Next, an operation of the matching position output apparatus 300 will be described. FIG. 11 is a flowchart showing an example of the operation of the matching position output apparatus 300. Referring to FIG. 11, after performing the same operation as the matching position output apparatus 100 described with reference to FIG. 4 (steps S1 to S4), the matching position output apparatus 300 further performs the following operation. First, the surface feature recognizing unit 1164 generates information featuring the surface of an object from the image of the appearance of the object shot with the camera 111 (step S7). Next, the shooting condition output unit 1165 acquires shooting condition information from the shooting condition database 1154 based on the information featuring the surface of the object generated by the surface feature recognizing unit 1164 (step S8). Next, the shooting condition output unit 1165 displays the acquired shooting condition information on the screen display unit 114 or/and transmit the acquired shooting condition information to an external device through the communication I/F unit 112 (step S9).

Thus, the matching position output apparatus 300 enables not only easy check of the matching position of an object but also easy check of a shooting condition appropriate for shooting a random pattern image at the matching position. The reason is that, first, when an image of the appearance of an object to be the target for checking a matching position and a shooting condition is shot with the camera 111, the object recognizing unit 1161 generates object identification information by object recognition from the shot image of the appearance of the object, and the matching position output unit 1162 acquires matching position information corresponding to the generated object identification information from the matching position database 1152 in which object identification information and matching position information are associated with each other and recorded, displays the matching position information on the screen display unit 114, or/and transmits the matching position information to an external device through the communication I/F unit 112. Moreover, the other reason is that the surface feature recognizing unit 1164 generates information featuring the surface of the object from the shot image of the appearance of the object, and the shooting condition output unit 1165 acquires shooting condition information corresponding to the generated information featuring the surface of the object from the shooting condition database 1154 in which information featuring object surface and a shooting condition are associated with each other and recorded, displays the shooting condition information on the screen display unit 114, or/and transmits the shooting condition information to an external device through the communication I/F unit 112.

Subsequently, a configuration example of the surface feature recognizing unit 1164 will be described.

Figure 12:
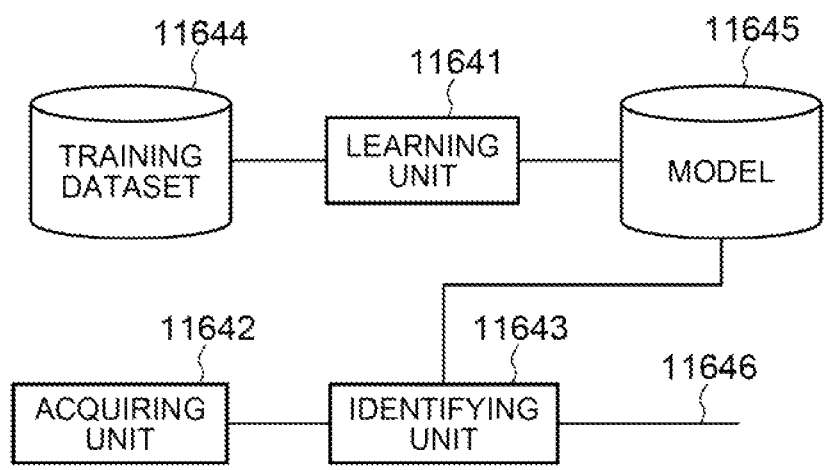
FIG. 12 is a block diagram of a surface feature recognizing unit in the matching position output apparatus according to the third example embodiment of the present invention.

FIG. 12 is a block diagram showing a configuration example of the surface feature recognizing unit 1164. The surface feature recognizing unit 1164 of this example includes a learning unit 11641, an acquiring unit 11642, a recognizing unit 11643, a training dataset 11644, and a model 11645.

The training dataset 11644 is the set of data in which an image of the appearance of an object to be the target for shooting condition check is associated with information featuring the surface of the object shown by the image. The training dataset 11644 exists for each kind of object to be the target for shooting condition check. The training dataset 11644 corresponding to one kind of object includes a plurality of training data. One training data includes a pair of an object appearance image and information featuring object surface. The information featuring object surface included by a plurality of training data corresponding to one kind of object are all the same. On the other hand, the object appearance images included by a plurality of training data corresponding to one kind of object are different from each other in shooting conditions such as the posture of an object, shooting direction, and lighting condition at the time of shooting. Use of the training dataset 11644 enables object surface feature recognition that is robust against the shooting conditions such as the posture of an object, shooting direction, and lighting condition at the time of shooting.

The learning unit 11641 is configured to perform learning by an object recognition method by deep learning using the training dataset 11644 and create the model 11645. The learning unit 11641 structures the model 11645, for example, on a convolutional neural network (CNN). The object recognition method by deep learning used by the learning unit 11641 can be, for example, an R-CNN based algorithm, a YOLO (You Only Look Once) type algorithm, or the like.

The acquiring unit 11642 is configured to acquire an image of the appearance of an object that is the target for shooting condition check from the camera 111. The recognizing unit 11643 is configured to input the image of the appearance of the object acquired by the acquiring unit 11642, perform inference by an object recognition method by deep learning from the input image using the model 11645 to detect the information 116464 featuring a specific object surface, and output the information 11646.

Next, an operation of the surface feature recognizing unit 1164 shown in FIG. 12 will be described. The operation of the surface feature recognizing unit 1164 is classified roughly into a learning operation and a recognition operation. In the learning operation, the learning unit 11641 generates the model 11645 using the training dataset 11644. In the recognition operation, the recognizing unit 11643 generates information featuring the surface of an object to be the target for shooting condition check from an image of the appearance of the object using the model 11645, and outputs the information.

Although the configuration example of the surface feature recognizing unit 1164 is described above, the surface feature recognizing unit 1164 is not limited to the above configuration example. For example, the surface feature recognizing unit 1164 may be configured to read a product code attached to an object by a barcode reader or the like, and generate information featuring a surface based on a correspondence table that previously associates a product code with an object surface feature.

In this example embodiment, the shooting condition output unit 1165 is configured to display acquired shooting condition information on the display screen of the screen display unit 114, or/and transmit acquired shooting condition information to an external device through the communication I/F unit 112. However, the shooting condition output unit 1165 may be configured to automatically regulate a shooting condition based on acquired shooting condition information.

Fourth Example Embodiment

Figure 13:
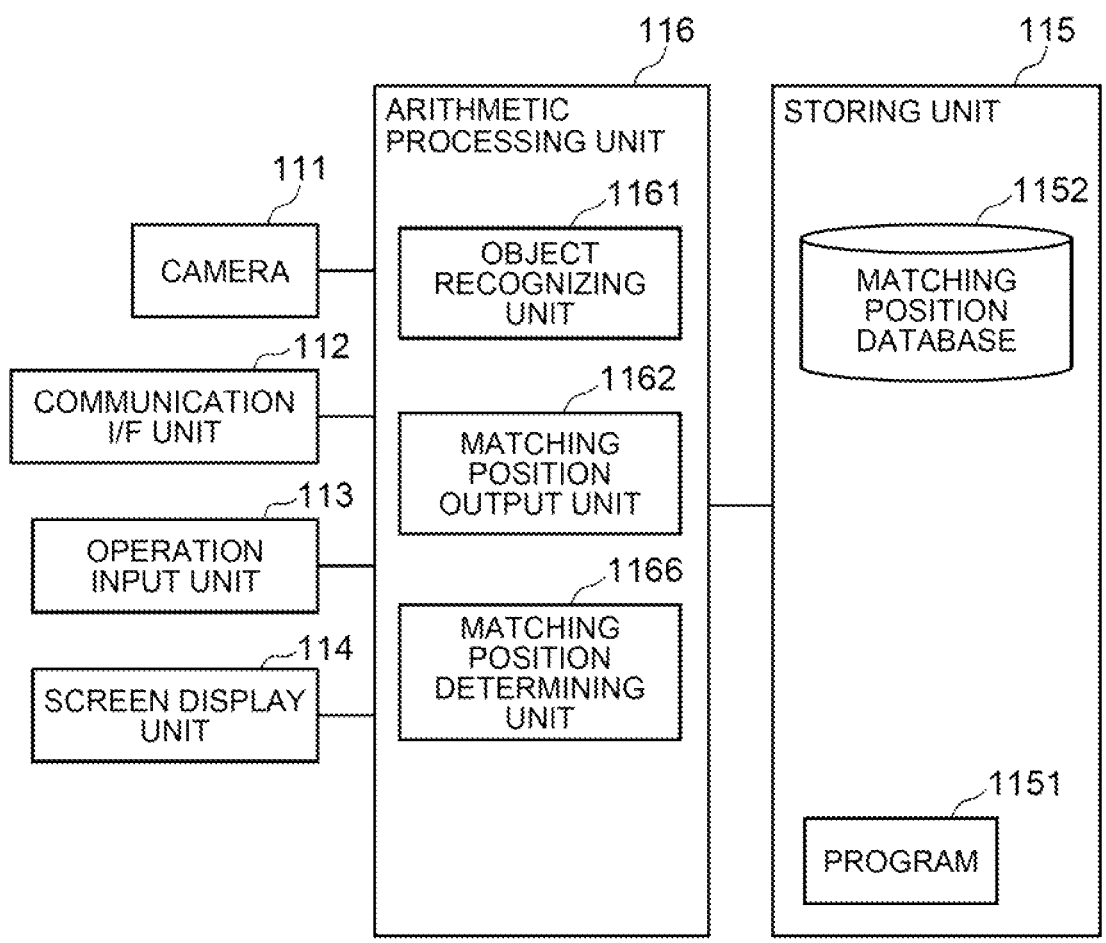
FIG. 13 is a block diagram of a matching position output apparatus according to a fourth example embodiment of the present invention.

Next, a matching position output apparatus 400 according to a fourth example embodiment of the present invention will be described. FIG. 13 is a block diagram of the matching position output apparatus 400, where the same reference numerals as in FIG. 1 denote the same parts, reference numeral 117 denotes a camera, and reference numeral 1166 denotes a matching position determining unit.

The camera 117 is a shooting means for shooting a random pattern formed on the surface of an object. The camera 117 may be, for example, a visible-light color camera including a CCD image sensor or a CMOS image sensor having a pixel capacity of about several million pixels.

The matching position determining unit 1166 is configured to, for each kind of object, perform learning and determine a matching position to be recorded into the matching position database 1152 from a candidate matching position of the object.

Figure 14:
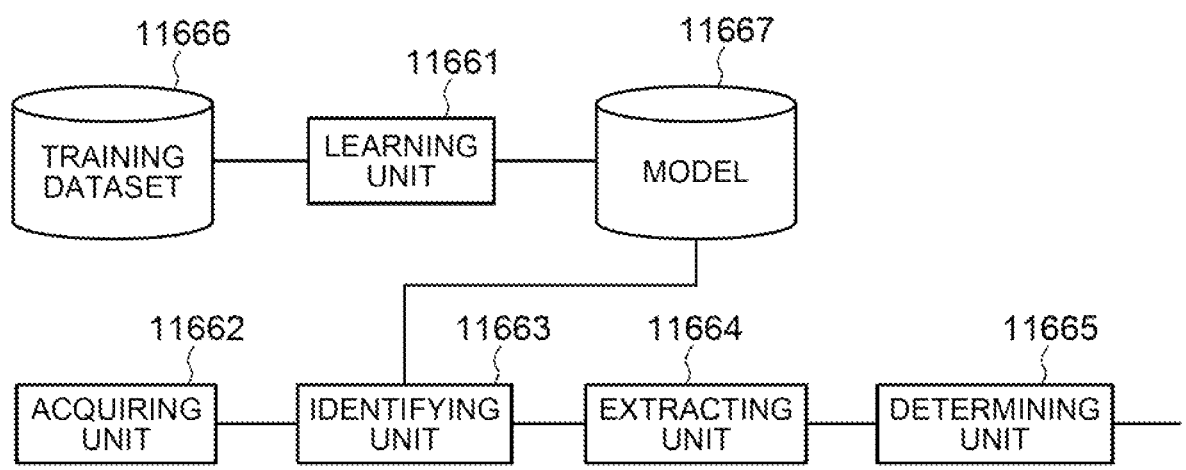
FIG. 14 is a block diagram of a matching position determining unit in the matching position output apparatus according to the fourth example embodiment of the present invention.

FIG. 14 is a block diagram showing a configuration example of the matching position determining unit 1166. The matching position determining unit 1166 of this example includes a learning unit 11661, an acquiring unit 11662, an identifying unit 11663, an extracting unit 11664, a determining unit 11665, a training dataset 11666, and a model 11667.

The training dataset 11666 is the set of data in which a random pattern image at a candidate matching position of an individual of object with individual identification information of the individual of object. The training dataset 11666 exists for each kind of object that is the target for determining a matching position. Moreover, the training dataset 11666 corresponding to one kind of object includes a training data subset of each individual of object. One training data subset includes a plurality of training data. One training data includes a pair of a random pattern image at a candidate matching position of an individual of object and individual identification information of the individual of object. Individual identification information included by a plurality of training data corresponding to one individual of object are all the same. On the other hand, random pattern images at candidate matching positions included by a plurality of training data corresponding to one individual of object are different from each other in shooting conditions such as the posture of object, shooting direction and lighting condition at the time of shooting and in use history of the individual of object at the time of shooting. The use history refers to the number of times or the number of days that the individual of object has been actually used. Use of the training dataset 11666 enables determination of a matching position at which individual identification that is robust against shooting conditions such as the posture of an object, shooting direction, and lighting condition and in use history at the time of shooting can be performed.

Figure 15:
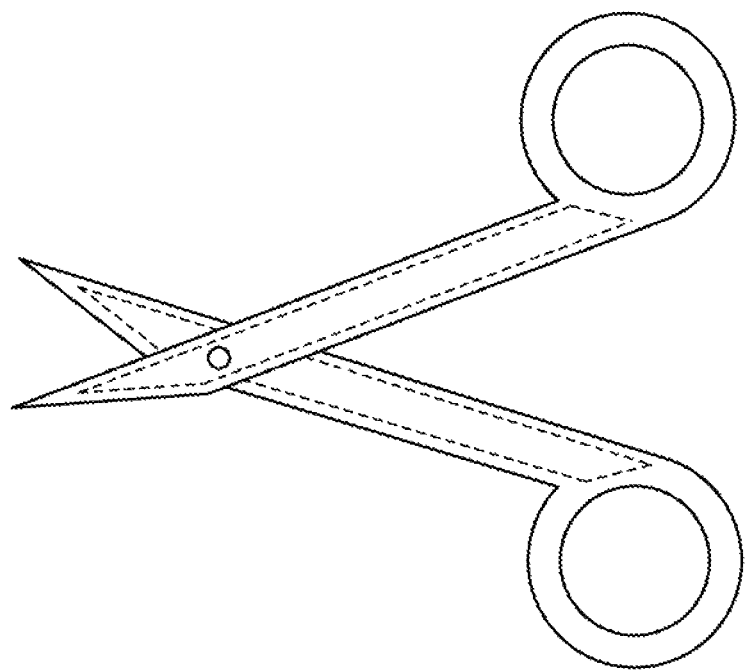
FIG. 15 is a view showing an example of a candidate matching position of medical scissors.

FIG. 15 shows an example of a candidate matching position of medical scissors. In this example, an area surrounded by broken line, that is, a blade surface exposed outside, a back surface hidden inside, both the surfaces of a grip portion, and so on are set as candidate matching positions.

The learning unit 11661 is configured to perform learning by an object recognition method by deep learning using the training dataset 11666 and create the model 11667. The learning unit 11661 structures the model 11667, for example, on a convolutional neural network (CNN). The object recognition method by deep learning used by the learning unit 11661 can be, for example, an R-CNN based algorithm, a YOLO (You Only Look Once) type algorithm, or the like.

The acquiring unit 11662 is configured to acquire a random pattern image at a candidate matching position of an individual identification target object from the camera 117. The identifying unit 11663 is configured to input the random pattern image acquired by the acquiring unit 11662, and perform inference by an object recognition method by deep learning from the input image using the model 11667 to identify an individual of object in the input image.

The extracting unit 11664 is configured to extract an area watched by the identifying unit 11663. That is to say, the extracting unit 11664 is configured to extract a partial area in the input image focused by the identifying unit 11663 when deriving the result of individual identification. The extracting unit 11664 can be configured by, for example, Grad-CAM (Gradient-Weighted Class Activation Mapping).

The determining unit 11665 is configured to determine the whole or part of the watched area extracted by the extracting unit 11664 as a matching position to be recorded into the matching position database 1152. Moreover, the determining unit 11665 is configured to display the determined matching position on the screen display unit 114, or/and output the determined matching position to an external device through the communication I/F unit 112.

Next, an operation of the matching position determining unit 1166 shown in FIG. 14 will be described. The operation of the matching position determining unit 1166 is classified roughly into a learning operation and a matching position determination operation. In the learning operation, the learning unit 11661 generates the model 11667 using the training dataset 11666. In the matching position determination operation, the identifying unit 11663 performs identification of an individual of object that is the target for matching position determination from a random pattern image at a candidate matching position of the individual by using the model 11667. At the time of individual identification, the extracting unit 11664 extracts a watched area at the time of individual identification, and the determining unit 11665 determines the whole or part of the watched area as a matching position of the kind of the individual identification target object, and outputs the matching position. The matching position output as described above corresponding to the kind of the object is further subjected to statistical processing such as selection of a mode value as necessary, and thereafter, associated with object identification information identifying the kind of the object and recorded, for example, manually into the matching position database 1152.

The other configuration and operation of the matching position output apparatus 400 are the same as the configuration and operation of the matching position output apparatus 100 shown in FIG. 1.

In this example embodiment, the matching position output unit 1162 is added to the matching position output apparatus 100 shown in FIG. 1, but the matching position output unit 1162 may be added to the matching position output apparatuses 200 and 300 shown in FIGS. 6 and 9.

Fifth Example Embodiment

Figure 16:
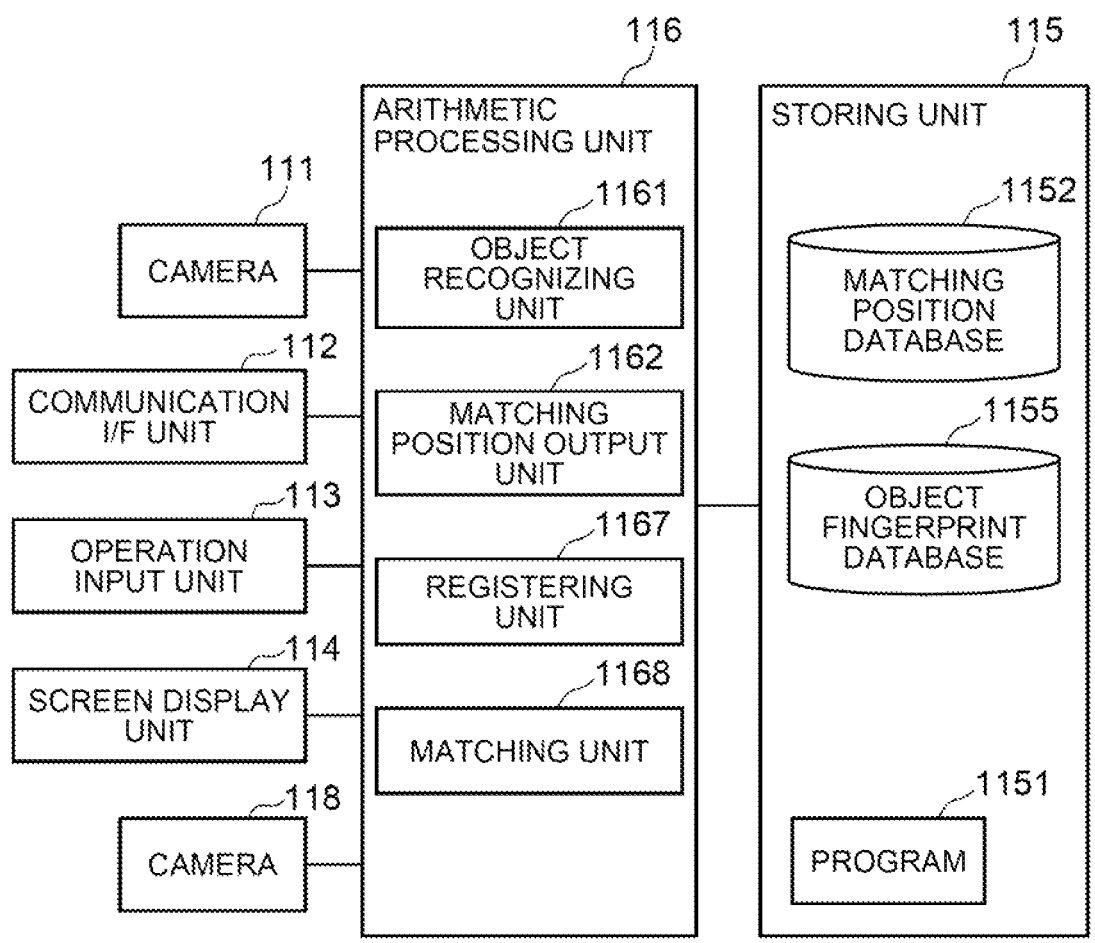
FIG. 16 is a block diagram of a matching position output apparatus according to a fifth example embodiment of the present invention.

Next, a matching position output apparatus 500 according to a fifth example embodiment of the present invention will be described. FIG. 16 is a block diagram of the matching position output apparatus 500, where the same reference numerals as in FIG. 1 denote the same parts, reference numeral 118 denotes a camera, reference numeral 1155 denotes an object fingerprint database, reference numeral 1167 denotes a registering unit, and reference numeral 1168 denotes a matching unit.

The camera 118 is a shooting means for shooting a random pattern formed on the surface of an object. The camera 118 may be, for example, a visible-light color camera including a CCD image sensor or a CMOS image sensor having a pixel capacity of about several million pixels.

The object fingerprint database 1155 is configured so that, for an individual of registration target object, a random pattern image obtained by shooting the individual and data to be affixed to the individual as a label are associated with each other and recorded. Data affixed to an individual as a label is any data. For example, in a case where a registration target object is a surgical instrument, data affixed to an individual as a label can be, for example, display items standardized in "Standard Guideline for Two dimensional (2D) Symbol Marking on Steel Instruments" by the Japan Association of Medical Devices Industries, that is, data of total 26 digits in total including an application identifier (01, 2-digit), standard codes on steel instruments (14-digit), an application identifier (21, 2-digit), and a serial number (8-digit). However, the number of digits and content of data affixed to an individual as a label are not limited to the above example. Moreover, a QR code obtained by converting data input by smartphone may be used as data affixed to an individual as a label.

The registering unit 1167 is configured to acquire a random pattern image at a matching position of an individual of registration target object from the camera 118. Moreover, the registering unit 1167 is configured to input data to be affixed to an individual of registration target object as a label from the operation input unit 113 or the communication I/F unit 112. Moreover, the registering unit 1167 is configured to associate the acquired random pattern image and the input data with each other and register into the object fingerprint database 1155. A random pattern image recorded into the object fingerprint database 1155 may be a feature value representing the feature of the random pattern image.

The matching unit 1168 is configured to acquire a random pattern image at a matching position of an individual of matching target (referred to as matching data hereinafter) from the camera 118. Moreover, the matching unit 1168 is configured to acquire a random pattern image of an individual of registration target object (hereinafter referred to as registration data) from the object fingerprint database 1155. Moreover, the matching unit 1168 is configured to calculate, for each registration data, a matching score representing the degree of similarity between the registration data and the matching data and calculate the maximum value of the matching scores. Moreover, the matching unit 1168 is configured to, if the maximum value of the matching scores is equal to or more than a predetermined threshold value, display data associated with the registration data related to the maximum value of the matching scores and recorded in the object fingerprint database 1155 as data affixed as a label to the individual of matching target on the screen display unit 114, or/and transmit the data to an external device through the communication I/F unit 112. Moreover, the matching unit 1168 is configured to, if the maximum value of the matching scores is less than the threshold value, display a determination result that the individual of matching target is not registered on the screen display unit 114, or/and transmit to an external device through the communication I/F unit 112.

Next, an operation of, by the matching position output apparatus 500, associating a random pattern image at a matching position of an individual of registration target object and data to be affixed as a label to the individual with each other and recording into the object fingerprint database 1155 will be described.

First, the object recognizing unit 1161 of the matching position output apparatus 500 shoots an appearance image of an individual of registration target object with the camera 111. This shooting operation can be performed, for example, manually by an operator or automatically by a robot. Next, the object recognizing unit 1161 performs object recognition on the external image of the individual of registration target object and generate object identification information. Next, the matching position output unit 1162 displays matching position information associated with the generated object identification information and recorded in the matching position database 1152 on the screen display unit 114, or/and transmit to a robot (not shown) through the communication I/F unit 112. Since the matching position information is displayed on the screen display unit 114, the operator can visually recognize a matching position of the individual of registration target object with ease. Moreover, since the matching position information is transmitted to the robot, the robot can recognize the matching position of the individual of registration target object. Furthermore, the matching position output unit 1162 transmits the matching position information associated with the generated object identification information and recorded in the matching position database 1152 to the registering unit 1167. Since the matching position information is transmitted to the registering unit 1167, the registering unit 1167 can recognize the matching position of the individual of registration target object.

Next, the registering unit 1167 shoots the matching position of the individual of registration target object with the camera 118 under an appropriate shooting condition. This can be performed, for example, manually by an operator or automatically by a robot. Next, the registering unit 1167 extracts an image of the matching position of the individual of registration target object from an image shot with the camera 118 based on the matching position information transmitted from the matching position output unit 1162. Moreover, the registering unit 1167 inputs data to be affixed as a label to the individual of registration target object from an external device through the operation input unit 113 or the communication I/F unit 112. Next, the registering unit 1167 associates the random pattern image at the matching position of the individual of registration target object and the data to be affixed as the label to the individual with each other and records into the object fingerprint database 1155.

The registration operation as described above is repeatedly executed on each individual of registration target object.

Next, a matching operation by the matching position output apparatus 500 of matching a random pattern image at a matching position of an individual of matching target object against a random pattern image recorded in the object fingerprint database 1155 will be described.

First, the object recognizing unit 1161 of the matching position output apparatus 500 shoots an appearance image of an individual of matching target object with the camera 111. This shooting operation can be performed, for example, manually by an operator or automatically by a robot. Next, the object recognizing unit 1161 performs object recognition on the external image of the individual of matching target object and generate object identification information. Next, the matching position output unit 1162 displays matching position information associated with the generated object identification information and recorded in the matching position database 1152 on the screen display unit 114, or/and transmit to a robot (not shown) through the communication I/F unit 112. Since the matching position information is displayed on the screen display unit 114, the operator can visually recognize a matching position of the individual of matching target object with ease. Moreover, since the matching position information is transmitted to the robot, the robot can recognize the matching position of the individual of matching target object. Furthermore, the matching position output unit 1162 transmits the matching position information associated with the generated object identification information and recorded in the matching position database 1152 to the matching unit 1168. Since the matching position information is transmitted to the matching unit 1168, the matching unit 1168 can recognize the matching position of the individual of matching target object.

Next, the matching unit 1168 shoots the matching position of the individual of matching target object with the camera 118 under an appropriate shooting condition. This can be performed, for example, manually by an operator or automatically by a robot. Next, the matching unit 1168 extracts a random pattern image at the matching position of the individual of matching target object from an image shot with the camera 118 based on the matching position information transmitted from the matching position output unit 1162. Next, the matching unit 1168 performs matching of the random pattern image at the matching position of the individual of matching target object against the random pattern image of the individual of registration target object recorded in the object fingerprint database 1155, displays the matching result on the screen display unit 114, or/and transmit the matching result to an external device through the communication I/F unit 112.

In this example embodiment, the object fingerprint database 1155, the registering unit 1167, and the matching unit 1168 are added to the matching position output apparatus 100 shown in FIG. 1, but the object fingerprint database 1155, the registering unit 1167, and the matching unit 1168 may be added to the matching position output apparatuses 200, 300, and 400 shown in FIGS. 6, 9, and 13.

Sixth Example Embodiment

Figure 17:
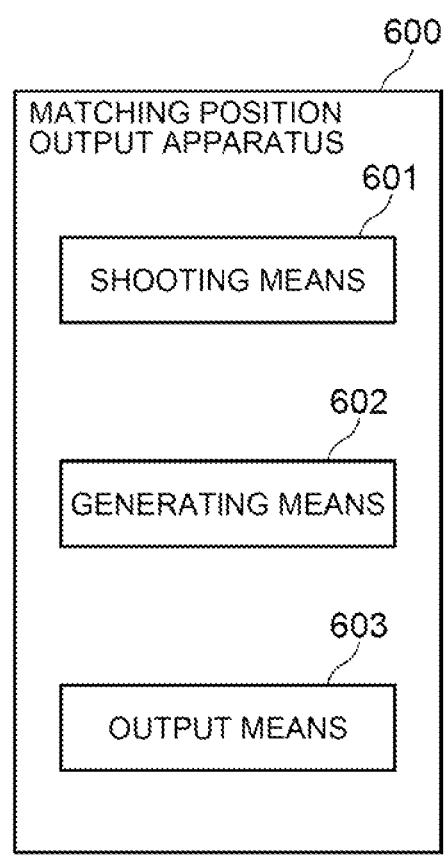
FIG. 17 is a block diagram of a matching position output apparatus according to a sixth example embodiment of the present invention.

Next, a matching position output apparatus 600 according to a sixth example embodiment of the present invention will be described. FIG. 17 is a block diagram of the matching position output apparatus 600. Referring to FIG. 17, the matching position output apparatus 600 includes a shooting means 601, a generating means 602, and an output means 603.

The shooting means 601 is configured to shoot an image of an object. The shooting means 601 can be configured, for example, in the same manner as the camera 111 of FIG. 1, but is not limited thereto. The generating means 602 is configured to generate information that identifies an object from an image of the object shot by the shooting means 601. The generating means 602 can be configured, for example, in the same manner as the object recognizing unit 1161 of FIG. 1, but is not limited thereto. The output means 603 is configured to, based on information that identifies an object generated by the generating means 602, acquire information of a matching position of an object from a recording means (not shown) that records therein information identifying an object and information of a matching position of an object so that they are associated with each other. The output means 603 can be configured, for example, in the same manner as the matching position output unit 1162 of FIG. 1, but is not limited thereto. Moreover, the recording means can be configured, for example, in the same manner as the matching position database of FIG. 1, but is not limited thereto.

The matching position output apparatus 600 thus configured operates in the following manner. First, the shooting means 601 shoots an image of an object. Next, the generating means 602 generates information identifying an object from the image of the object shot by the shooting means 601. Next, the output means 603 acquires, based on the information identifying the object generated by the generating means 602, information of a matching position of an object from a recording means (not shown) that records therein the information identifying the object and the information of the matching position of the object so that they are associated with each other.

According to the matching position output apparatus 600, it is possible to easily check the matching position of an object. The reason is that the matching position output apparatus 600 includes the shooting means 601 shooting an image of an object, the generating means 602 generating information for identifying an object from the shot image of the object, and the output means 603 acquiring, based on the generated information for identifying the object, information of a matching position of an object from a recording means (not shown) that records therein the information identifying the object and the information of the matching position of the object so that they are associated with each other.

Other Example Embodiment

Although the present invention has been described above with reference to the example embodiments, the present invention is not limited to the example embodiments. The configurations and details of the present invention can be changed in various manners that can be understood by one skilled in the art within the scope of the present invention. For example, the following forms are also included by the present invention.

For example, in this example embodiment, the matching position database, the shooting condition database, and the object fingerprint database are provided in the storing unit 115 connected to the arithmetic processing unit 116, but some or all of the databases may be provided on the cloud.

The present invention can be used for individual identification and authenticity determination of an object such as a surgical instrument, and the like, and in particular, can be used for confirmation of a matching position at the time of performing individual identification and authenticity determination by using the difference between individuals in random patterns on the surface of an object.

The whole or part of the example embodiments disclosed above can be described as, but not limited to, the following supplementary notes.

[Supplementary Note 1]

A matching position output system comprising:

a shooting means configured to shoot an image of an object;

a generating means configured to generate information identifying the object from the shot image of the object; and an output means configured to, based on the generated information identifying the object, acquire information of a matching position of the object from a recording means, and output the information of the matching position of the object, the recording means being configured to associate and record the information identifying the object and the information of the matching position of the object.

[Supplementary Note 2]

The matching position output system according to Supplementary Note 1, wherein:

the recording means is further configured to associate and record the information identifying the object and a shooting condition in shooting the matching position of the object; and the output means is further configured to, based on the generated information identifying the object, acquire the shooting condition in shooting the matching position of the object from the recording means, and output the shooting condition.

[Supplementary Note 3]

The matching position output system according to Supplementary Note 1, wherein the recording means is further configured to associate and record data featuring a surface of the object and a shooting condition in shooting the matching position of the object, the matching position output system further comprising a generating means configured to generate the data featuring the surface of the object from the shot image of the object, wherein the output means is further configured to, based on the generated data featuring the surface of the object, acquire the shooting condition in shooting the matching position of the object from the recording means, and output the shooting condition.

[Supplementary Note 4]

The matching position output system according to Supplementary Note 3, wherein the output means is configured to calculate an approximation between the generated data featuring the surface of the object and the data featuring the surface of the object recorded in the recording means, and acquire the shooting condition in shooting the matching position of the object from the recording means based on the calculated approximation.

[Supplementary Note 5]

The matching position output system according to any of Supplementary Notes 1 to 4, further comprising a matching position determining means configured to determine, by learning, the matching position of the object to be recorded into the recording means from a candidate matching position of the object.

[Supplementary Note 6]

The matching position output system according to Supplementary Note 5, wherein the matching position determining means includes:

a learning means configured to learn a model by an object recognition method by deep learning, by using training data including a random pattern image of the candidate matching position;

an identifying means configured to perform individual identification on an input image including the random pattern image of the candidate matching position, by using the model;

an extracting means configured to extract a watched area watched by the identifying means; and a determining means configured to determine a whole or part of the watched area as the matching position of the object to be recorded into the recording means.

[Supplementary Note 7]

A matching position output method comprising:

shooting an image of an object;

generating information identifying the object from the shot image of the object; and based on the generated information identifying the object, acquiring information of a matching position of the object from a recording means, and outputting the information of the matching position of the object, the recording means being configured to associate and record the information identifying the object and the information of the matching position of the object.

[Supplementary Note 8]

The matching position output method according to Supplementary Note 7, wherein the recording means is further configured to associate and record the information identifying the object and a shooting condition in shooting the matching position of the object, the matching position output method comprising, in the outputting, further acquiring, based on the generated information identifying the object, the shooting condition in shooting the matching position of the object from the recording means, and outputting the shooting condition.

[Supplementary Note 9]

The matching position output method according to Supplementary Note 7, wherein the recording means is further configured to associate and record data featuring a surface of the object and a shooting condition in shooting the matching position of the object, the matching position output method further comprising generating the data featuring the surface of the object from the shot image of the object, and the matching position output method comprising, in the outputting, further acquiring, based on the generated data featuring the surface of the object, the shooting condition in shooting the matching position of the object from the recording means, and outputting the shooting condition.

[Supplementary Note 10]

The matching position output method according to Supplementary Note 9, comprising in the outputting, calculating an approximation between the generated data featuring the surface of the object and the data featuring the surface of the object recorded in the recording means, and acquiring the shooting condition in shooting the matching position of the object from the recording means based on the calculated approximation.

[Supplementary Note 11]

The matching position output method according to any of Supplementary Notes 7 to 10, further comprising determining, by learning, the matching position of the object to be recorded into the recording means from a candidate matching position of the object.

[Supplementary Note 12]

12. The matching position output method according to Supplementary Note 11, wherein the determining the matching position by learning includes:

learning a model by an object recognition method by deep learning, by using training data including a random pattern image of the candidate matching position;

performing individual identification on an input image including the random pattern image of the candidate matching position, by using the model;

extracting a watched area for the individual identification; and determining a whole or part of the watched area as the matching position of the object to be recorded into the recording means.

[Supplementary Note 13]

A non-transitory computer-readable recording medium having a program recorded thereon, the program comprising instructions for causing a computer to execute:

a process of shooting an image of an object;

a process of generating information identifying the object from the shot image of the object; and a process of, based on the generated information identifying the object, acquiring information of a matching position of the object from a recording means, and outputting the information of the matching position of the object, the recording means being configured to associate and record the information identifying the object and the information of the matching position of the object.

DESCRIPTION OF NUMERALS 100 matching position output apparatus
111 camera
112 communication I/F unit
113 operation input unit
114 screen display unit
115 storing unit
116 arithmetic processing unit
200 matching position output apparatus
300 matching position output apparatus
400 matching position output apparatus
500 matching position output apparatus
600 matching position output apparatus
601 shooting means
602 generating means
603 output means
1151 program
1152 matching position database
1153 shooting condition database
1154 shooting condition database
1155 object fingerprint database
1161 object recognizing unit
1162 matching position output unit
1163 shooting condition output unit
1164 surface feature recognizing unit
1165 shooting condition output unit
1166 matching position determining unit
1167 registering unit
1168 matching unit
11611 learning unit
11612 acquiring unit
11613 recognizing unit
11614 training dataset
11615 model
11616 object identification information
11641 learning unit
11642 acquiring unit
11643 recognizing unit
11644 training dataset
11645 model
11646 information that features object surface
11661 learning unit
11662 acquiring unit
11663 identifying unit
11664 extracting unit
11665 determining unit
11666 training dataset
11667 model
L1 matching position
L21 matching position
L22 matching position

What is claimed is:

1. A matching position output system comprising:
a first memory containing program instructions; and
a processor coupled to the first memory, wherein the processor is configured to execute the program instructions to:
shoot an image of an object;
generate information identifying the object from the shot image of the object;
based on the generated information identifying the object, acquire information of a matching position of the object from a second memory, and output the information of the matching position of the object, the second memory associating and recording the information identifying the object and the information of the matching position of the object,
associate and record into the second memory data featuring a surface of the object and a shooting condition in shooting the matching position of the object;
generate the data featuring the surface of the object from the shot image of the object; and
based on the generated data featuring the surface of the object, acquire the shooting condition in shooting the matching position of the object from the second memory, and output the shooting condition.

2. The matching position output system according to claim 1, wherein the processor is further configured to execute the instructions to:
calculate an approximation between the generated data featuring the surface of the object and the data featuring the surface of the object recorded in the second memory, and acquire the shooting condition in shooting the matching position of the object from the second memory based on the calculated approximation.

3. The matching position output system according to claim 1, wherein the processor is further configured to execute the instructions to:
determine, by learning, the matching position of the object to be recorded into the second memory from a candidate matching position of the object.

4. The matching position output system according to claim 3, wherein the processor is further configured to execute the instructions to:
learn a model by an object recognition method by deep learning, by using training data including a random pattern image of the candidate matching position;
perform individual identification on an input image including the random pattern image of the candidate matching position, by using the model;
extract a watched area for the individual identification; and
determine a whole or part of the watched area as the matching position of the object to be recorded into the second memory.

5. A matching position output method comprising:
shooting an image of an object;

generating information identifying the object from the shot image of the object; and based on the generated information identifying the object, acquiring information of a matching position of the object from memory, and outputting the information of the matching position of the object, the memory associating and recording the information identifying the object and the information of the matching position of the object; and generating data featuring a surface of the object from the shot image of the object, wherein the memory further associates and records the data featuring the surface of the object and a shooting condition in shooting the matching position of the object, wherein the outputting comprises acquiring, based on the generated data featuring the surface of the object, the shooting condition in shooting the matching position of the object from the memory, and outputting the shooting condition.

6. The matching position output method according to claim 5, comprising in the outputting, calculating an approximation between the generated data featuring the surface of the object and the data featuring the surface of the object recorded in the memory, and acquiring the shooting condition in shooting the matching position of the object from the memory based on the calculated approximation.

7. The matching position output method according to claim 5, further comprising determining, by learning, the matching position of the object to be recorded into the memory from a candidate matching position of the object.

8. The matching position output method according to claim 7, comprising, in the determining the matching position by learning:

learning a model by an object recognition method by deep learning, by using training data including a random pattern image of the candidate matching position;

performing individual identification on an input image including the random pattern image of the candidate matching position, by using the model;

extracting a watched area for the individual identification; and determining a whole or part of the watched area as the matching position of the object to be recorded into the memory.

9. A non-transitory computer-readable recording medium having a program recorded thereon, the program comprising instructions for causing a computer to execute:

a process of shooting an image of an object;

a process of generating information identifying the object from the shot image of the object; and a process of, based on the generated information identifying the object, acquiring information of a matching position of the object from a memory, and outputting the information of the matching position of the object, the memory associating and recording the information identifying the object and the information of the matching position of the object; and a process of generating data featuring a surface of the object from the shot image of the object, wherein the memory further associates and records the data featuring the surface of the object and a shooting condition in shooting the matching position of the object, wherein the outputting comprises acquiring, based on the generated data featuring the surface of the object, the shooting condition in shooting the matching position of the object from the memory, and outputting the shooting condition.

* * * * *